United States Patent

[11] 3,570,390

[72] Inventors Hans Jordan
2260 Maravilla Drive, Hollywood, Calif. 90028;
Peter C. Jordan, 110 Pleasant St., Lexington, Mass. 02173
[21] Appl. No. 881,983
[22] Filed Dec. 4, 1969
[45] Patented Mar. 16, 1971

[54] COFFEE MAKER, OR THE LIKE
9 Claims, 2 Drawing Figs.
[52] U.S. Cl. .................................................. 99/282, 99/307
[51] Int. Cl. ..................................................... A47j 31/32
[50] Field of Search ........................................ 99/280, 281, 282, 283, 300, 302, 307, 315

[56] References Cited
UNITED STATES PATENTS
2,846,938  8/1958  Brandl ........................ 99/281
3,278,087  10/1966  Stasse ........................ 99/302
3,371,592  3/1968  Remy ......................... 99/282

*Primary Examiner*—Robert W. Jenkins
*Attorney*—Harris, Kiech, Russell & Kern

ABSTRACT: A drip-type coffee maker which maintains the hot water in contact with the ground coffee for at least approximately the same length of time irrespective of the quantity of coffee being brewed, within the capacity range of the apparatus. The coffee maker includes a drip pot, a water reservoir, a heat actuable, flow-through pump for pumping hot water from the reservoir to the drip pot, an electric heater for actuating the pump, and adjustable thermostatic control means regulating the heat output of the heater for causing the pump to deliver different quantities of hot water from the reservoir to the drip pot in approximately equal overall time intervals, the control means being manually adjustable to vary the overall pumping rate of the pump as a function of the quantity of water in the reservoir.

Patented March 16, 1971

3,570,390

INVENTORS
HANS JORDON,
PETER C. JORDON
BY THEIR ATTORNEYS
HARRIS, KIECH, RUSSELL & KERN

COFFEE MAKER, OR THE LIKE

BACKGROUND OF INVENTION

The present invention relates in general to an apparatus for brewing coffee, tea, or the like, and more particularly, to a coffee maker of the drip type, i.e., a coffee maker which passes the hot water through the ground coffee only once.

It is essential in brewing good coffee that the brewing time be at least approximately constant irrespective of the amount of coffee being made. In other words, it is important that the hot water be maintained in contact with the ground coffee for at least approximately the same interval of time whether making one cup, ten cups, or more. Established standard brewing times for different standard grinds require a contact time between the hot water and the ground coffee of from one to three minutes for the so-called fine or vacuum grind, a contact time of four to six minutes for the so-called drip or urn grind, and a contact time of from six to eight minutes for the so-called regular grind.

At least one prior automatic drip coffee maker known to us is designed to provide the proper brewing time for a particular grind only when making a full pot of coffee. If a smaller quantity is made, the contact time between the hot water and the ground coffee is correspondingly reduced, the result being a weak brew lacking in flavor. If such a conventional coffee maker were designed to provide approximately the correct brewing time at some fraction of capacity, the brewing time would be increased above the optimum in making a full pot, resulting in an excessively strong and bitter extract.

SUMMARY AND OBJECTS OF INVENTION

The primary object of the present invention is to provide an automatic drip coffee maker which maintains the hot water and the ground coffee in contact for a time interval within the optimum range irrespective of the quantity of coffee being brewed, within the capacity range of the apparatus.

More particularly, the basic object of the invention is to provide an automatic drip coffee maker which achieves approximately equal overall brewing times throughout the entire capacity range of the apparatus, from the minimum to the maximum.

More specifically, an important object of the invention is to provide an automatic drip coffee maker, or the like, which includes: a drip pot which receives a quantity of ground coffee corresponding to the quantity of brew desired and which receives the brew produced by a corresponding quantity of hot water from the reservoir into the drip pot and over the ground coffee therein; an electric heater for actuating the pump; and control means regulating the heat output of the heater for causing the pump to deliver different quantities of hot water from the reservoir to correspondingly different quantities of ground coffee in the drip pot in approximately equal overall time intervals, within the optimum time interval range for the particular grind being used.

Still more particularly, an important object of the invention is to provide a coffee maker of the foregoing nature wherein the control means comprises thermostat means responsive to the heat output of the heater for regulating the heat output thereof, the thermostat means being manually adjustable to vary the overall pumping rate of the pump as a function of the quantity of the water in the reservoir. Stated differently, an important object is to provide a thermostat means which is manually settable for different quantities of water, and which automatically produces correspondingly different overall water pumping rates to achieve approximately equal overall brewing time intervals within the optimum range for the particular grind.

Another object of the invention is to provide a coffee maker wherein the thermostat means comprises a switch in series with the heater which is closed at least substantially continuously when the thermostat means is adjusted for the full capacity of the coffee maker, and which is closed only intermittently when the thermostat means is adjusted for a quantity of coffee maker wherein the thermostat means initially maintains the heater energized throughout a time interval sufficiently long to thoroughly wet the ground coffee with hot water, when making a quantity of coffee less than capacity, before intermittent energization of the heater occurs.

A further object of the invention is to provide an automatic drip coffee maker having the foregoing characteristics wherein the drip pot is a separate vessel located alongside the reservoir, the pump and the heater for actuating the pump being associated with the reservoir.

Yet another object is to provide an auxiliary, continuously operating electric heater associated with the drip pot for maintaining the coffee extract therein at a desired temperature.

An automatic drip coffee maker constructed and operated in accordance with the foregoing objects of the invention provides a uniform extract irrespective of quantity made, which is an important feature of the invention.

The foregoing objects, and advantages, features and results of the present invention, together with various other objects, advantages, features and results which will be evident to those skilled in the coffee brewing art in the light of this disclosure, may be achieved with the exemplary embodiment of the invention illustrated in the accompanying drawing and described in detail hereinafter.

DESCRIPTION OF EXEMPLARY EMBODIMENT OF INVENTION

Figure 1:
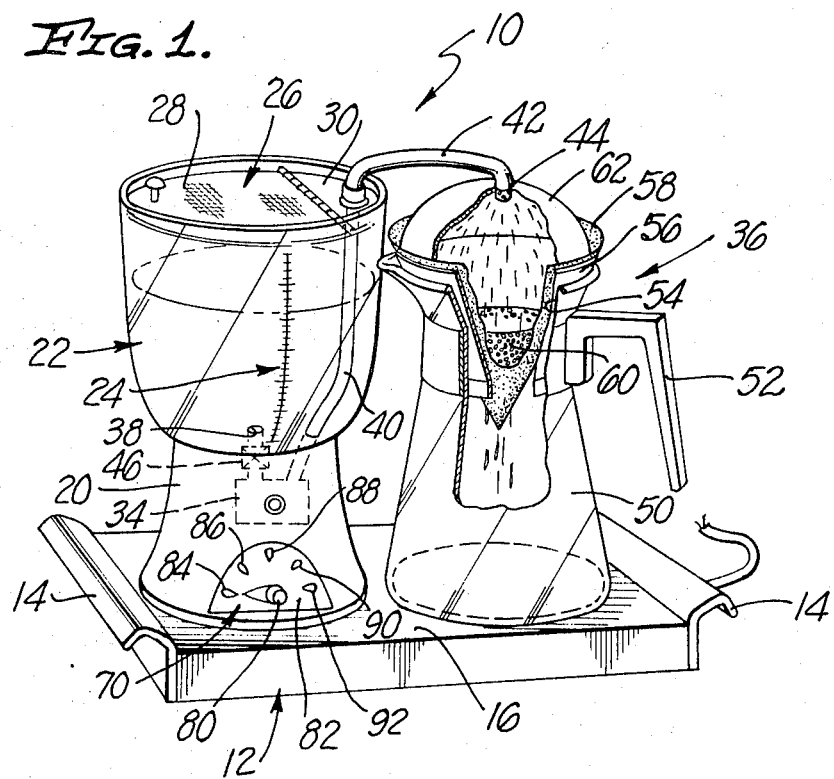
FIG. 1 is a perspective view illustrating an automatic drip coffee making apparatus which embodies the invention.

Referring to the drawing, the automatic drip coffee maker of the invention is designated generally therein by the numeral 10 and includes a traylike base 12 having handles 14 at its ends for convenience in carrying the coffee maker from one location to another. The upper wall 16 of the base is preferably metallic to conduct heat for a purpose which will be explained hereinafter. The handles 14 are preferably made of a material, such as a suitable plastic, having a low heat conductivity so that they will remain relatively cool.

Mounted on the base 12 adjacent one end thereof is a housing 20 carrying a water reservoir 22. The latter is preferably transparent so that the water level therein is readily visible. A scale 24 on one side of the reservoir 22 indicates the quantity of water therein, the scale preferably being calibrated in cups. The reservoir 22 is provided with a cover 26 which preferably is bodily removable for cleaning of the reservoir. Access to the interior of the reservoir 22 is attained by pivoting a hinged portion 28 of the cover 26 upwardly relative to a stationary portion 30 thereof. Preferably, the hinged portion 28 includes a fine mesh screen through which water may be poured into the reservoir 22, the screen retaining any solid matter above a corresponding particle size.

Within the housing 20 is a heat actuable, flow-through pump 34 of conventional construction for pumping hot water from the reservoir 22 to a drip pot designated generally by the numeral 36 and seated on the base 12 adjacent the other end thereof from the reservoir 22. The pump 34 has an inlet 38 in communication with the bottom of the reservoir 22, and is provided with an outlet line 40 which includes a generally horizontal arm 42 terminating in a nozzle 44 for spraying hot water evenly over a bed of ground coffee supported in the drip pot 36 in a manner to be described. As indicated, the pump 34 is conventional and may be of any suitable construction. For example, it may include a check valve 46 for preventing reversed flow back into the reservoir 22.

Figure 2:
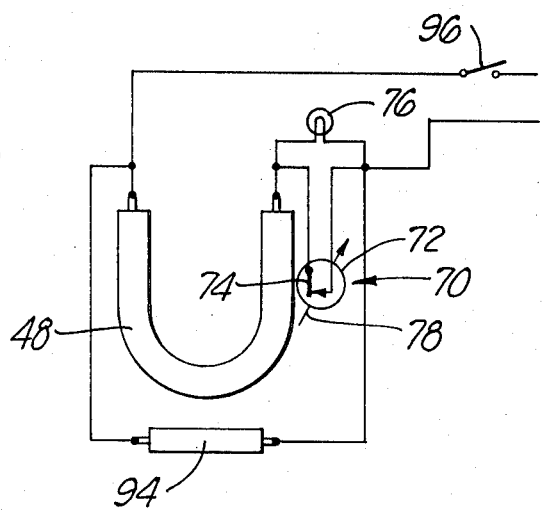
FIG. 2 is a schematic wiring diagram showing the electrical circuitry incorporated in the coffee maker of the invention.

As is conventional, the pump 34 is actuated by an electric resistance heater 48, FIG. 2. This heater is disposed within the housing 20 adjacent the pump 34, as is well known in the art.

The drip pot 36 includes a brew receiving vessel 50 which is seated on the base 12 and which is provided with a suitable handle 52. The upper end of the vessel 50 is flared upwardly to provide a seat 54 for an annular, downwardly tapered filter support 56. Seated in the latter is a conical filter 58 of any suitable material in which is placed a bed 60 of ground coffee. A removable cover 62 encloses the open upper end of the vessel 50 and is provided at the top thereof with a central opening for the spray nozzle 44.

The coffee maker 10 of the invention includes control means 70 regulating the heat output of the heater 48 for varying the overall pumping rate of the pump 34 as a function of the volume of water in the reservoir 22, in such a way as to cause the pump to pump different quantities of water from the reservoir in approximately equal overall time intervals. Thus, as hereinbefore explained, the hot water delivered to the drip pot 36 is maintained in contact with the coffee bed 60 for approximately the same length of time irrespective of the quantity of coffee being brewed. This insures uniform flavor and quality whether the amount of coffee to be brewed represents the minimum capacity of the coffee maker 10, the maximum capacity thereof, or some quantity in between, which is an important feature of the invention.

Considering the control means 70, it includes thermostat means 72, FIG. 2, located in the housing 20 adjacent the heater 48 so as to be responsive to the heat output thereof. Preferably, the housing of the pump 34 also houses the heater 48 and the thermostat means 72 to form an integral unit. The thermostat means 72 is shown as including a switch 74 which is connected in series with the heater 48 and which opens when the temperature reaches a predetermined level. An indicator light 76 in parallel with the switch 74 is energized whenever the switch is open to deenergize the heater 48. The thermostat means 72 is adjustable manually to vary the temperature at which the switch 74 opens, the variability of the thermostat means being designated by the arrow 78 in FIG. 2. As shown in FIG. 1, the housing 20 is provided with a pointer handle 80 for manually adjusting the thermostat means 72, this handle being pivotable over a scale 82 having thereon indicia 84, 86, 88, 90 and 92 respectively corresponding, for example, to two, three, four, six and eight cups of coffee.

The upper wall 16 of the base 12 conducts heat from the heater 48, when it is on, to the coffee receiving vessel 50 to keep any coffee extract therein warm. Additionally, the coffee maker 10 includes an auxiliary heater 94, FIG. 2, carried by the base 12 adjacent or below the vessel 50. This auxiliary heater is on constantly, while the coffee maker 10 is in use, so as to keep any coffee in the vessel 50 hot. It will be understood that the heat output of the auxiliary heater 94 is small as compared to the heat output of the main heater 48 when the latter is on.

OPERATION OF COFFEE MAKER 10

For convenience in considering the operation of the invention, it will be assumed that the coffee maker 10 is designed for use with so-called regular grind coffee, having an optimum brewing time, i.e., and optimum contact time between the hot water and the ground coffee bed 60, of from six to eight minutes. The characteristics of the main heater 48, the pump 34 and the thermostat means 72 are so selected as to heat the water taken from the reservoir 22 to approximately 195° F. to 205° F. prior to spraying it over the ground coffee bed 60, this being the optimum water temperature range for brewing good coffee.

It will be assumed further in considering the operation of the invention that the coffee maker 10 is designed to brew anywhere from two to eight cups of coffee, in which case the thermostat-means settings 84, 86, 88, 90 and 92 may respectively correspond to two, three, four, six and eight cups. The characteristics of the pump 34, the heater 48 and the thermostat means 72 are such that when the thermostat-means setting 92, corresponding to eight cups of coffee, is used, the heater 48 is energized continuously until all of the water in the reservoir 22 has flowed by gravity to the pump 34 and has been heated and delivered to the drip pot 36, whereupon the thermostat means 72 deenergizes the heater 48. These characteristics are further so selected as to provide a pumping rate requiring six to eight minutes to empty the reservoir 22 when using regular grind coffee under the conditions specified.

The characteristics of the pump 34, the heater 48 and the thermostat means 72 are further so selected that the pump 34 operates intermittently, with any of the settings 84, 86, 88 and 90 corresponding to less than the maximum of eight cups, in such a manner as to deliver the corresponding quantities of hot water to corresponding ground coffee beds 60 in approximately equal time intervals, in the optimum range of six to eight minutes for regular grind coffee. Under such conditions the main heater 48 is energized initially for a length of time sufficient to pump enough hot water to the ground coffee bed 60 to wet it thoroughly. By the time this occurs, the heater 48 has heated the thermostat means 72 enough to produce intermittent heater operation throughout the rest of the brewing cycle. In each instance, the light 76 comes on whenever the heater 48 goes off to indicate this fact. When the light 76 comes on and stays on substantially continuously, the brewing cycle is completed.

The mode of operation of the automatic drip coffee maker 10 of the invention may be made clearer by considering a couple of specific examples. It will first be assumed that eight cups of coffee extract are to be brewed from regular grind ground coffee. In this instance, 48 ounces of water placed in the reservoir 22 and 80 grams of regular grind ground coffee are placed in the filter 58 to form the coffee bed 60. The adjusting handle 80 for the thermostat means 72 is placed opposite the eight-cup indicium 92, and the coffee maker 10 is then turned on, as by closing a switch 96. Given the characteristics of the pump 34, the heater 48 and the thermostat means 72 hereinbefore set forth, the heater 48 is energized continuously until all of the water has been heated and pumped into the drip pot 36. Thereupon, the thermostat means 72 deenergizes the heater 48, and the light 76 comes on and stays on substantially continuously to indicate that the cycle has been completed.

Considering the minimum capacity of the coffee maker 10, e.g., two cups, the operator places 12 ounces of water in the reservoir 22 and 20 grams of regular grind ground coffee in the filter 58 to form the ground coffee bed 60. The handle 80 is set opposite the indicium 84, corresponding to two cups. Upon closure of the switch 96, the heater 48 is energized initially for 30 seconds or more, whereupon the thermostat means 72 opens the switch 74 to deenergize the heater. As the result of this initial energization, perhaps twenty-five percent of the water in the reservoir 22 flows through the pump 34, being heated to the desired temperature and sprayed over the coffee bed 60, thereby thoroughly wetting it. Subsequently, the thermostat means 72 turns the heater 48 on and off so that the balance of the water in the reservoir 22 is delivered to the drip pot 36 slowly throughout the next six to six and one-half minutes. After all of the water has been pumped out of the reservoir 22, the heater 48 causes the thermostat means 72 to hold the switch 74 open, except for extremely brief closures to reheat the thermostat means as required to cause it to keep the heater 48 substantially deenergized. This condition is indicated by a substantially continuous energization of the indicator light 76.

In each of the foregoing examples, the quantity of water used is delivered to the ground coffee bed 60 throughout an interval of time totaling approximately six minutes to eight minutes, the control means 70 so regulating the heat output of the heater 48 as to vary the overall pumping rate of the pump 34 as a function of the volume of water in the reservoir 22 in such a manner as to cause the pump to pump different quantities of water from the reservoir in approximately equal overall time intervals. Thus, irrespective of whether two cups or eight cups of coffee extract are brewed, the contact time between the hot water and the ground coffee bed 60 is at least approximately the same so that, in all instances, the same quality and flavor of coffee extract are obtained, which is an important feature of the invention.

The various parts of the coffee maker 10 requiring cleaning are readily separable from each other to facilitate cleaning same. For example, the cover 26 is removable, to facilitate cleaning. Similarly, the arm 42 of the outlet line 40 is removable. Except for the handle 80 of the vessel 50, all components of the drip pot 36 are readily separable for cleaning purposes.

Although an exemplary embodiment of the invention has been disclosed herein for purposes of illustration, it will be understood that various changes, modifications and substitutions may be incorporated in such embodiment without departing from the invention.

We claim:

1. In a water delivery system for a drip pot, the combination of:
   a. a water reservoir;
   b. a heat actuable pump for pumping water from said reservoir at a desired temperature;
   c. an electric heater for actuating said pump; and
   d. control means regulating the heat output of said heater for varying the overall pumping rate of said pump as a function of the volume of water in said reservoir.

2. In a water delivery system for a drip pot containing ground coffee, the combination of:
   a. a water reservoir;
   b. a heat actuable, flow-through pump for pumping water from said reservoir to the ground coffee in the drip pot at a desired temperature;
   c. an electric heater for actuating said pump; and
   d. control means regulating the heat output of said heater for causing said pump to pump different quantities of water from said reservoir in approximately equal overall time intervals.

3. A water delivery system according to claim 2 wherein said control means includes means for initially maintaining the heater energized throughout a time interval sufficiently long to thoroughly wet the ground coffee with hot water, when making a quantity of coffee less than capacity, before reducing the heat output of the heater.

4. A water delivery system as set forth in claim 2 wherein said control means comprises thermostat means responsive to the heat output of said heater for regulating the heat output thereof, said thermostat means being manually adjustable to vary the overall pumping rate of said pump as a function of the quantity of water in said reservoir.

5. In a drip-type coffee maker, or the like, the combination of:
   a. a drip pot;
   b. a water reservoir;
   c. a heat actuable, flow-through pump for pumping hot water from said reservoir to said drip pot;
   d. an electric heater for actuating said pump; and
   e. control means regulating the heat output of said heater for causing said pump to deliver different quantities of hot water from said reservoir to said drip pot in approximately equal overall time intervals.

6. A coffee maker, or the like, as set forth in claim 5 wherein said control means comprises thermostat means responsive to the heat output of said heater for regulating the heat output thereof, said thermostat means being manually adjustable to vary the overall pumping rate of said pump as a function of the quantity of water in said reservoir.

7. A coffee maker, or the like, according to claim 6 wherein said thermostat means comprises a switch in series with said heater which is closed substantially continuously when said thermostat means is adjusted for the maximum quantity of water in said reservoir and which is closed only intermittently when said thermostat means is adjusted for a smaller quantity of water.

8. A coffee maker, or the like, as defined in claim 7 wherein said drip pot is a separate vessel located alongside said reservoir.

9. A coffee maker, or the like according to claim 8 including an auxiliary, continuously operating electric heater for heating said drip pot.

UNITED STATES PATENT OFFICE
CERTIFICATE OF CORRECTION

Patent No. 3,570,390          Dated March 16, 1971

Inventor(s) Hans JORDAN and Peter C. JORDAN

It is certified that error appears in the above-identified patent and that said Letters Patent are hereby corrected as shown below:

Column 1: Line 48, after "hot water" insert --passing through the ground coffee; a water reservoir; a heat actuable, flow-through pump for pumping hot wat--

Column 2: Line 1, after "coffee" insert --less than capacit A related object is to provide a coffee--
Line 16, after "irrespective of" insert --the--
Line 38, "traylike" should be --tray-like--

Signed and sealed this 17th day of August 1971.

(SEAL)
Attest:

EDWARD M. FLETCHER, JR.        WILLIAM E. SCHUYLER, JR.
Attesting Officer                Commissioner of Patents